March 19, 1940.　　　F. B. SCHORCK　　　2,194,433
APPARATUS FOR CHARRING BARRELS
Filed Aug. 2, 1939　　　5 Sheets-Sheet 1

INVENTOR
Frank B. Schorck,
BY John L. Milton,
ATTORNEY

March 19, 1940.　　　F. B. SCHORCK　　　2,194,433
APPARATUS FOR CHARRING BARRELS
Filed Aug. 2, 1939　　　5 Sheets-Sheet 2

INVENTOR
Frank B. Schorck,
BY
John L. Milton,
ATTORNEY

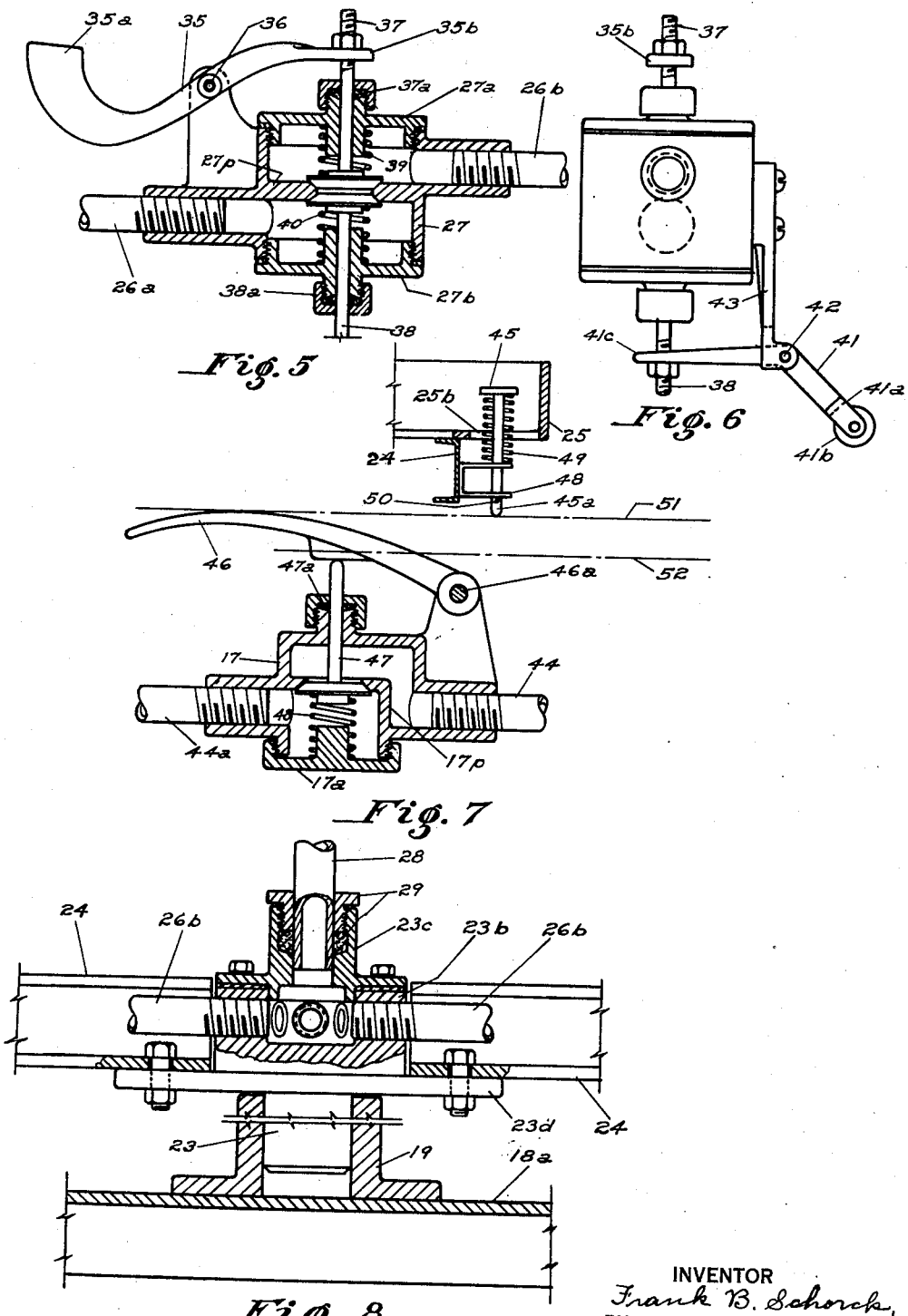

March 19, 1940. F. B. SCHORCK 2,194,433
APPARATUS FOR CHARRING BARRELS
Filed Aug. 2, 1939 5 Sheets-Sheet 4

INVENTOR
Frank B. Schorck,
BY
John L. Milton
ATTORNEY

Patented Mar. 19, 1940

2,194,433

UNITED STATES PATENT OFFICE 2,194,433

APPARATUS FOR CHARRING BARRELS

Frank B. Schorck, Louisville, Ky., assignor to Chess & Wymond, Incorporated, Louisville, Ky., a corporation of Delaware Application August 2, 1939, Serial No. 287,941

17 Claims. (Cl. 263—5)

This invention relates to improvements in the construction of apparatus for charring the interior of barrel-shells.

The invention has for its principal object the provision of means for more accurate control of barrel charring with a material reduction in the unit cost thereof.

The invention also has for its object the provision of a machine that will greatly reduce the number of attendants required during the charring stages over that previously required.

The invention further has for its object the provision of apparatus for charring barrel-shells in a continuous and uniform manner so as to increase materially efficiency in production manufacturing.

Other objects of the invention include the provision of means for automatic application and removal of flame for barrel charring; automatic quenching of the ignited charred barrels; steadying of the barrel shells during charring; protecting the ends of the barrel-shells during charring; successive releasing of the barrel-shells for removal; and automatically and successively ejecting the barrel-shells after their release.

The invention also comprehends means for coordinating the action of the various instrumentalities organized to provide for the aforesaid objects, and to improve the design and construction of the apparatus as a whole.

These and other objects of my invention will become more apparent to those versed in the art as the hereinafter specification is read in connection with the accompanying drawings, in which;

Figure 5 is an enlarged sectional view of the double-acting gas valve illustrated in Figure 4;

Figure 6 is an elevational view of the valve illustrated in Figure 5 as viewed from a position substantially at right angles with the plane of Figure 5;

Figure 7 is a sectional view of the water valve, shown in the lower left hand corner of Figure 1, which valve controls the flow of the water employed in quenching the ignited barrel-shells after the charring operation is completed;

Figure 8 is an enlarged sectional view of the central axis for the turntable carrying the barrel-shells, and illustrates the construction of the connection to the gas supply line for the gas burners employed to ignite the barrel-shells;

Figure 1:
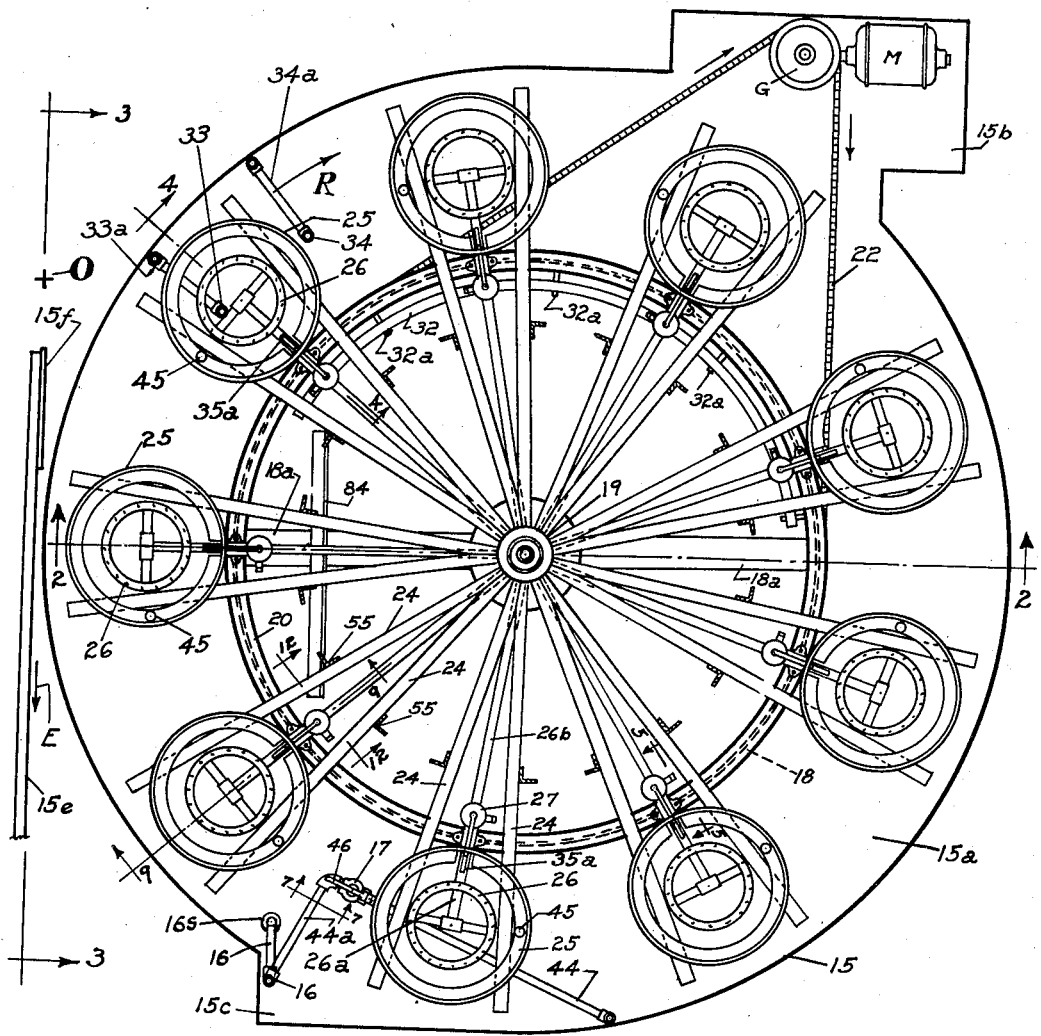
Figure 1 is a partial plan view of the machine with the overhead canopy and ejecting apparatus located above the table bed omitted.
Figure 3:
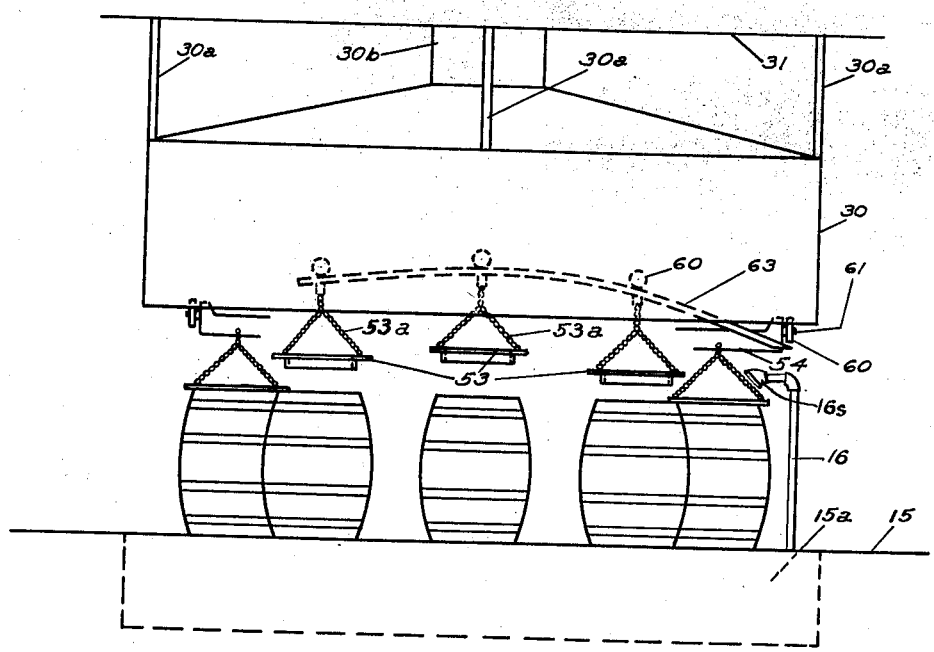
Figure 3 is a partial elevation, as viewed in the direction of arrows 3, 3 at the left of Figure 1, and illustrates the means for steadying the barrel-shells and protecting the ends thereof, together with the apparatus employed to release automatically the aforesaid means, so that the barrel-shells may be removed.

Referring now to the above drawings, in which the various parts are indicated by numerals, 15 indicates the floor level of the room in which the machine is placed, and 15a designates a pit below the floor level within which the principal portion of the apparatus is located. In Figure 1, pit 15a is illustrated as being substantially circular in form, with the exception that an offset portion 15b is provided within which an operating motor M and gear reduction device G is located. The pit is also provided with a second offset portion 15c from which a vertical pipe connection 16 extends upwardly to a spraying head 16s, which spraying head is positioned above the top level of the barrel-shells, as illustrated in Figure 3. The aforesaid spraying head is positioned so as to direct a spray of water into the open upper end of the barrel-shell as the valve 17 is momentarily actuated by a passing barrel-shell support.

Figure 2:
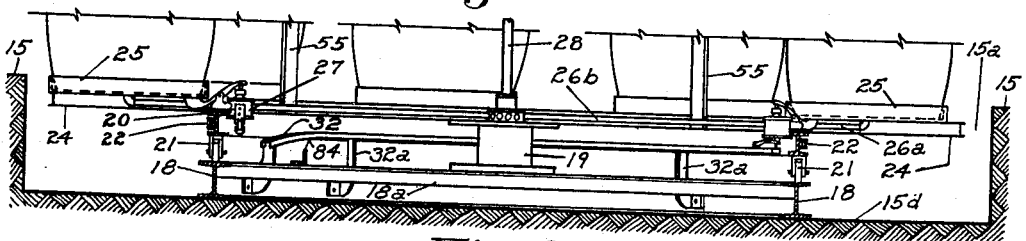
Figure 2 is a partial sectional elevation, taken along lines 2, 2 of Figure 1, illustrating the lower portion of barrel-shells in position for charring.

In Figures 1 and 2 it will be observed that a circular rail 18 is placed substantially concentric with the circular pit 15a. In the particular embodiment illustrated, the rail 18 is formed from a conventional I-beam section and is securely fastened to the floor of the pit 15a. A reinforcing channel section 18a extends substantially diametrically across the circular rail 18. The location of the reinforcing channel 18a is particularly shown in Figure 2, and it will be observed that a hub 19 is placed centrally of the reinforcing channel 18a, which hub 19 pivotally guides a rotatable table carrying the barrel-shells.

The rotatable table consists essentially of an annular ring-shaped member 20, which member is likewise preferably formed from a conventional I-beam section. In Figure 2 it will be observed that the ring-shaped member 20 has a diameter substantially equal to that of the rail 18, and is also equipped with a series of casters or rollers 21, which rollers track on the upper surface of rail 18. Within the outer trough of the ring-shaped member 20, a chain drive 22 is provided, which chain drive is connected to a suitable sprocket on the gear reduction unit G, as illustrated in Figure 1. It is to be understood that, about the periphery of the ring-shaped member 20, and within the outer trough thereof, suitable teeth are provided, which teeth cooperate with the chain 22 to form a positive drive for the rotatable table.

Referring now to Figure 8, it will be observed that the hub 19 is fixedly secured to the reinforcing channel 18a. Within the bore of hub 19 a pintle 23 operates, which pintle carries therewith an enlarged disk 23d and boss 23b. It will also be observed that channel supporting members 24 are fixedly secured to the disk 23d, and, that these members extend substantially radially therefrom. In Figure 1 it will be observed that two supporting channels are provided for each barrel-shell support.

It is also to be understood that the channel supports 24 are fixedly secured to the upper surface of the ring-shaped member 20. In Figure 1 it will be further observed that, at the outer extremities of each pair of channel members 24, an annular barrel-shell support 25 is secured thereto.

Within each barrel-shell support 25 a gas burner 26 is provided, and each burner is connected by a suitable pipe 26a to a double acting gas valve 27.

Figure 4:
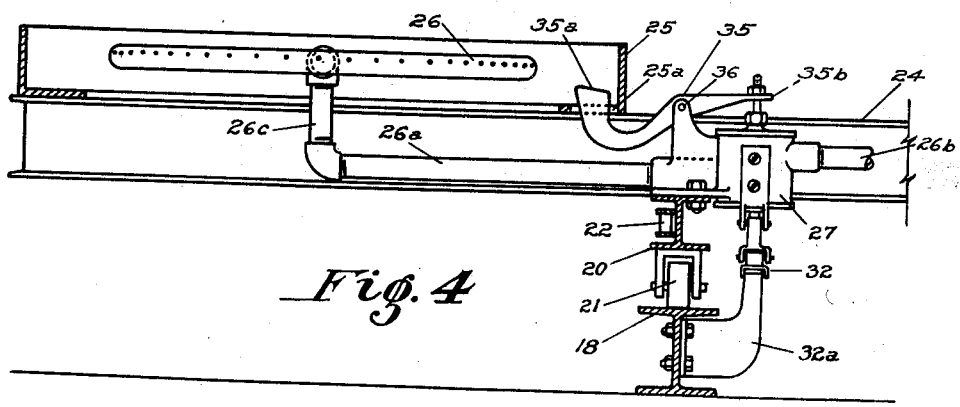
Figure 4 is an enlarged sectional view taken along lines 4, 4 of Figure 1, and illustrates one of the valves and associated apparatus employed in automatically connecting and disconnecting fuel from the burners which ignite the interior of the barrel-shells for charring.

In Figure 4 the construction of a gas burner 26 and barrel-shell support 25 is shown in an enlarged scale, and it will also be observed that a suitable pipe 26b extends from the gas valve 27 to the boss 23b at the center of the machine.

Reference is also directed to Figures 1 and 8, which figures illustrate the connection of the pipes 26b to the central boss 23b.

In Figure 8 it will be observed that the central portion of the boss 23b is hollow and forms a fuel distribution chamber. A cover 23c is provided for the chamber, and a pipe connection 28, which communicates with the gas supply line, extends through the center of the cover 23c. Since the pipe 28 is stationary, a suitable stuffing box 29 is provided in the cover 23c to form a pressure seal therewith.

In the preferred embodiment of my invention, it has been found that a rotatable table having 9 barrel-shell supports provides sufficient capacity, when the table is revolved at approximately one revolution in 96 seconds. This arrangement has been found to provide sufficient time for igniting the barrel-shells by the gas burners, and for subsequently quenching the ignited barrel-shells by the water spray after the charring operation is completed. With this arrangement it has also been found that a single operator can load the machine and dispatch the ejected barrel-shells to a carrier, which conveys the charred shells to the machines that complete them into finished barrels.

While I have found the above relations to be satisfactory in actual service conditions, I am aware that the number of barrel-shell supports, and the speed of the rotatable table, can be altered without departing from the spirit of my invention. However, for the purpose of this disclosure, a table carrying nine barrel-shell supports is described as being the preferred arrangement. Therefore, it will be apparent, by referring to Figure 1, that each barrel-shell support consists of two radially extending channel supports 24, and an annular barrel-shell support 25. Between each pair of channel supports 24 a suitable pipe 26b forms the connection from the fuel distribution chamber to the corresponding gas valve 27.

As particularly shown in Figure 4, each gas valve 27 is fixedly secured to the ring-shaped member 20.

In order to distribute satisfactorily the weight of the rotatable table, I have found that two casters 21 for each barrel-shell support is sufficient.

In the illustrated embodiment of my invention, a caster 21 is fixedly secured to the under surface of the ring-shaped member 20 beneath each channel support 24.

Referring now to Figures 2 and 3, it will be observed that the floor level of the room in which the machine is placed is substantially in horizontal alignment with the top edges of the annular barrel-shell supports 25. This arrangement has been found to simplify loading and unloading, as the operator is required only to roll the barrel-shells into position on the machine.

Since considerable heat is given off by the flames of the intermittently operated gas burners 26, and by the flame of the ignited barrel-shells during charring, an annular canopy 30 is placed above the machine, which canopy is substantially concentric with the rotatable table structure. To afford protection for the operator, should he accidently contact the canopy, it has been found advisable to line the canopy with asbestos, or an equivalent thermal insulation. In Figure 3, 31 indicates the ceiling level of the room in which the machine is placed, and the characters 30a designate hangers or suitable supports, which secure the canopy to the ceiling. The top of the canopy has a frusto-conical shape and is provided with an exhaust conduit 30b at the center thereof.

In Figure 1 I have indicated the relative position of the operator, who controls the loading of the machine, by the character O. I have also indicated the direction of rotation of the rotatable table by an arrow R. To the left of Figure 1, the numeral 15e indicates the near one of two parallel rails that are positioned sufficiently close one to the other, and to the machine, and inclined to form a gravity conveyor for dispatching the charred barrel-shells to other machines that finish the same into completed barrels. The characters 15f indicate upwardly inclined stops on the ends of the rails 15e, which stops serve to assure the ejected barrel-shells rolling away from the machine in the direction indicated by the arrow E. It is also to be understood that a suitable conveyor, or other means, is provided for bringing barrel-shells to the operator at the position O, so that the operator can consecutively load the barrel-shell supports 25 of the machine without leaving his position. In Figure 1 it will be apparent that the barrel-shell support 25, falling along the line 4, 4 has advanced slightly beyond the position of loading.

In Figure 1 it will also be observed that a cam rail 32 is placed adjacent the inner edge of the ring-shaped member 20. As shown in Figures 2 and 4, the cam rail 32 is adjustably secured by brackets 32a to the inner trough of the annular rail 18. The cam rail 32 is employed to actuate the lower valve stems of the double acting valves 27. Accordingly, it is to be understood that the cam rail 32 is arranged so that its location along the rail can be changed, thereby fixing the time in which the corresponding burners 26 are ignited and extinguished according to the predetermined requirements of the barrel shells under treatment. In this respect it is to be understood that the cam rail 32 consists of several overlapping segments, which segments are adjustably secured one to the other. This arrangement enables the length of the cam rail to be adjusted, so that the duration of time for which the burners 26 are ignited can likewise be set to suit the particular requirements of the barrel-shells under treatment.

In Figure 1, the numeral 33 designates a pilot burner, which burner is connected to a gas supply line by a suitable pipe connection 33a. It is to be understood that the pilot 33 continuously burns during the operation of the machine. It is also to be understood that the position of the pilot 33 can be changed to accommodate any desired setting of the cam rail 32. In the actual embodiment of the machine, I have provided a series of pilot burners within the pit 15a, another of which is indicated by the numeral 34, and it is to be understood that either one or several of the pilots are continuously operated according to the requirements.

Having thus described the general relation existing between the various component parts of the machine, each of the individual elements will be described in detail before the operation of the machine is explained in full.

Gas burners

As mentioned hereinbefore, substantially concentric with each barrel-shell support 25 a gas burner 26 is located. These gas burners consist of a ring-shaped pipe provided with small burner holes about the periphery thereof. A central transverse conduit extends substantially diametrically across the ring-shaped burner 26 through which entering gas flows to the burner holes. A vertical pipe connection 26c is also provided, and it is to be understood that this vertical connection is provided with a suitable air regulating device for the burner. A typical construction for the burner is illustrated in Figure 4, and it will be observed that a suitable pipe 26a serves to connect the burner assembly to the gas valve 27.

Two-way gas valves

The two-way gas valves serve a very important function in the operation of the machine. These valves control the flow of gas to the corresponding gas burners 26, and are so constructed that gas will not be supplied to its burner 26, unless a barrel-shell is properly located in the corresponding barrel-shell support 25, and the cam rail 32 operating the corresponding valve.

Figures 1, 2, 4, 5 and 6 are of particular importance in understanding the operation of the two-way gas valves. In Figure 4 it will be observed that a notch 25a is formed in the bottom of each barrel-shell support 25 substantially adjacent the point of contact of the lower edge of the barrel-shell, when the same is properly located within the barrel-shell support 25.

As hereinbefore mentioned, one gas valve 27 is provided for each gas burner 26, and each gas valve is fixedly secured to the top surface of the ring-shaped member 20 that forms the base for the rotatable table assembly.

With reference to Figure 5, it will be observed that the valve 27 is provided with a lever 35, which lever is pivotally secured to the body of the gas valve at 36. At one end of the lever 35, an extension 35a is provided, which extension extends upwardly through the notch 25a formed in the bottom of the barrel-shell support 25. At the other side of the pivotal connection 36, a projection 35b engages the plunger of a valve stem 37.

Within the body of the gas valve 27, a partition 27p divides the valve into two chambers. With further reference to Figure 5, it will be observed that the partition 27p has formed, in its opposite faces, seats for the valve stems 37 and 38. It will also be observed that the upper and lower chambers formed by the partition 27p, are provided with covers 27a and 27b respectively. The upper valve stem 37 is provided with a spring 39, which spring normally biases the valve stem into engagement with its associate seat. Similarly, the lower valve stem 38 is provided with a spring 40, which spring likewise serves to bias the lower valve stem into engagement with its corresponding seat.

To provide pressure seals about the plungers of the valve stems 37 and 38, packing assemblies 37a and 38a are provided.

As hereinbefore mentioned, a pipe 26a serves to connect each valve to its gas burner, while a pipe 26b serves to connect each valve to the fuel distribution chamber within the boss 23b at the center of the machine, from which the connection to the gas supply line is completed.

In Figure 6, a second lever 41 having an extension 41a and roller 41b is illustrated. As shown, the lever 41 is pivotally secured at 42 to a support member 43, which support is fixedly secured to the body of the gas valve 27. The lever 41 is also provided with a projection 41c, which projection engages the plunger of the valve stem 38.

From the foregoing it will be apparent that normally, with the lever extensions 35a and 41a un-operated, the springs 39 and 40 retain their corresponding valve stems closed, and therefore close communication between the gas lines 26a and 26b.

During the rotation of the rotatable table, each roller 41b successively engages the cam rail 32, which engagement opens the port controlled by the corresponding valve stem 38. However, even though operation of a valve stem 38 is effected, gas is not allowed to flow from the pipe 26b to its associate burner pipe 26a. On the other hand, if a barrel-shell has been previously properly located in the corresponding barrel-shell support 25, the extension 35a is depressed, and the upper valve stem opened via lever 35. Under these conditions gas is permitted to flow from the supply pipe 26b to the burner pipe 26a.

Therefore, it will be apparent that, when a barrel shell is properly placed in a support 25, the lever 35 is operated. Accordingly, when the corresponding roller 41b subsequently engages the cam rail 32, the lever 41 opens its valve stem 38, and allows gas to flow from the gas supply line to the burner 26. Substantially simultaneously with the operation of each lever 41, each corresponding gas burner 26 passes over the flame of pilot 33, which successively ignites the burners 26. Each ignited burner 26 continues to burn until each corresponding roller 41b subsequently disengages the cam rail 32. It is to be understood that each burner remains ignited for a time sufficient to ignite the interior of each corresponding barrel-shell so that charring will continue without the gas flame until the water-spray subsequently extinguishes the ignited band-shells.

Water spray

As hereinbefore mentioned, a spray of water is directed into the open upper-end of each ignited barrel-shell just before the barrel-shell is released for ejection from the machine. In Figure 1 it will be observed that a single-acting valve 17 is provided, which valve controls the flow of water to the spray head 16s as a barrel-shell passes thereover. The numeral 44 designates a suitable pipe connection to the water supply line, and the numerals 44a and 16 designate pipe connections to the spray head 16s. As hereinbefore mentioned, the spray head 16s is positioned above the level of the upper ends of the barrel-shells, and is positioned to direct an intermittent spray of water into a corresponding barrel-shell, as the same passes over the single-acting valve 17. In Figures 1 and 3, the location of the spray head 16s relative to the valve 17 is clearly illustrated.

Referring now to Figure 7, it will be observed that each barrel-shell support 25 is provided with an aperture 25b through which a plunger 45 operates. In this respect it is to be understood that the head of the plunger 45 is located so that the lower end of a barrel-shell depresses same, when the barrel-shell is properly located within the support 25. It is also to be understood that the plunger 45 is located in the support 25 so that its lower end 45a will engage the lever 46, when the plunger 45 is depressed.

As indicated in Figure 7, each plunger 45 is slidably mounted in a suitable bracket 48, which bracket is fixedly secured to one of the corresponding channel supporting members 24. A spring 49 normally serves to bias the plunger 45 upwardly, and out of the path of the lever 46. A pin 50 in the lower end of the plunger 45 serves to limit the upward movement thereof. In Figure 7 the upper dot-dash line 51 designates the path of travel of the lower end 45a of the plunger 45, when the plunger is in its normal position. The lower dot-dash line 52 designates the path of travel of the end 45a, when the plunger is depressed by a barrel-shell properly located within the support 25.

As illustrated in Figure 7, the single-acting water-valve 17 is provided with a partition 17p, which partition divides the valve body into two compartments. The partition 17p has formed therein a valve seat for the valve stem 47. A spring 48 normally serves to bias the valve stem to its closed position. To afford access to the lower chamber of the valve assembly, the lower chamber is provided with a cover 17a. A packing assembly 47a provides a suitable pressure seal on the plunger of the valve stem 47. The lever 46 is pivotally secured to the body of the valve 17 at 46a, and the spring 48 is sufficiently strong so that the weight of the lever 46 will not actuate the valve stem 47.

As hereinbefore mentioned, pipes 44a and 16 connect the valve 17 and spray head 16s, while pipe 44 connects the valve 17 to the water supply line.

From the foregoing, it will be apparent that the lever 46 is depressed to operate valve stem 47, only when a barrel-shell depresses its corresponding plunger 45.

Releasing device

Figure 9:
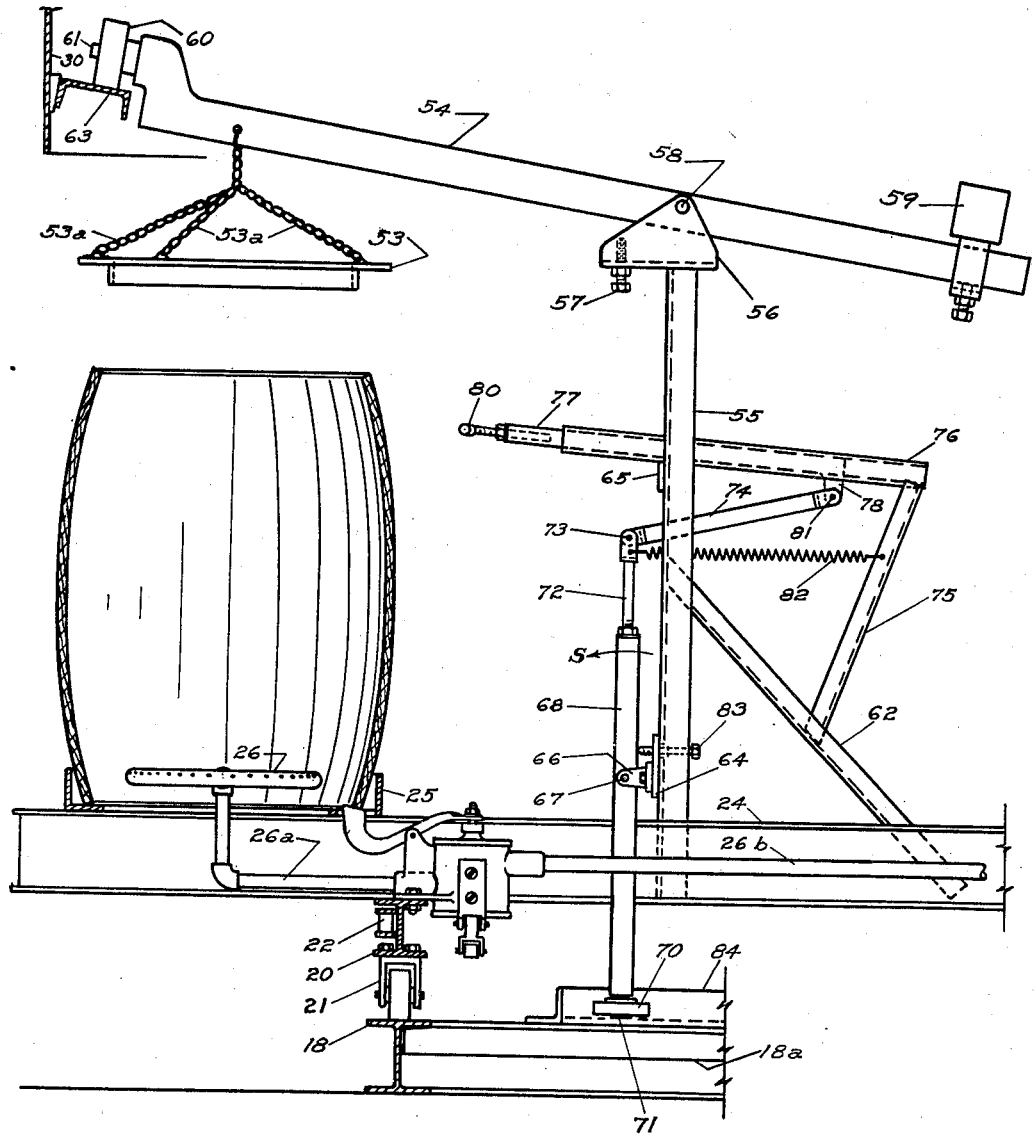
Figure 9 is an enlarged sectional view taken along lines 9, 9 of Figure 1, and illustrates a top end-protector and steadying device for the barrel-shell lifted from its operating position, and with the ejecting device in position for operation.
Figure 10:
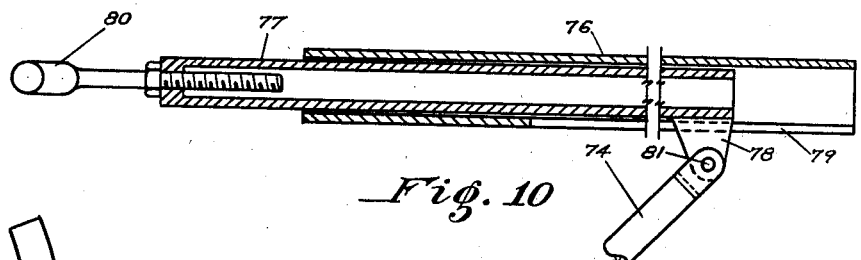
Figure 10 is an enlarged sectional view of the barrel ejecting-device.
Figure 11:
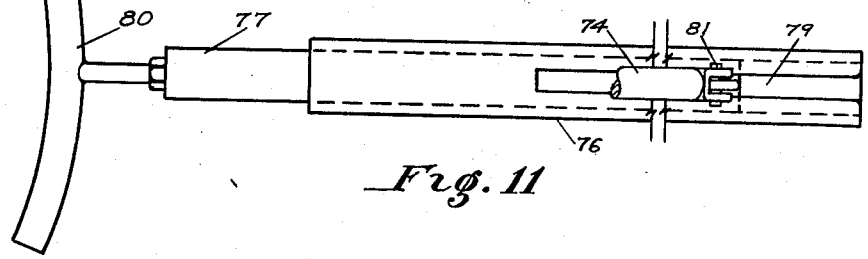
Figure 11 is a plan view of the ejecting device illustrated in Figure 10.

As hereinbefore mentioned, the machine contemplates the use of means for protecting the end edges of the barrel-shells during the stages of charring. With reference to Figure 9, it will be observed that the annular barrel-shell support 25 is formed from an angle section; one leg thereof projecting vertically to form a locating guide for a barrel-shell, while the other leg extends horizontally to form a supporting rest for the lower end of the barrel-shell. It will also be observed that the burner 26 is positioned within the barrel-shell, and slightly above the lower edge thereof. Therefore, it will be obvious that the flame from the gas burner 26 will strike the barrel-shell above its lower edge. Accordingly, the lower edge of the barrel-shell is not affected by the gas flame from the burner 26. As illustrated in Figure 3, an annular, protecting-ring 53 is provided for protecting the upper end of each barrel-shell. Each protecting ring 53 also serves to steady its corresponding barrel-shell during the charring stages. Accordingly, I have incorporated into the machine means for automatically positioning the protecting rings 53 and for releasing them after the charring of each corresponding barrel-shell has been completed.

With reference to Figure 9 it will be observed that the protecting ring 53 is likewise formed from an angle section and utilizes one of its legs as a supporting rest, and its other leg as a protecting flange for the upper edge of the barrel-shell.

Each ring 53 is attached to the end of a lever 54 by suitable chains 53a or other flexible media that will not be affected by the flames produced during the charring of the barrel shells.

Figure 12:
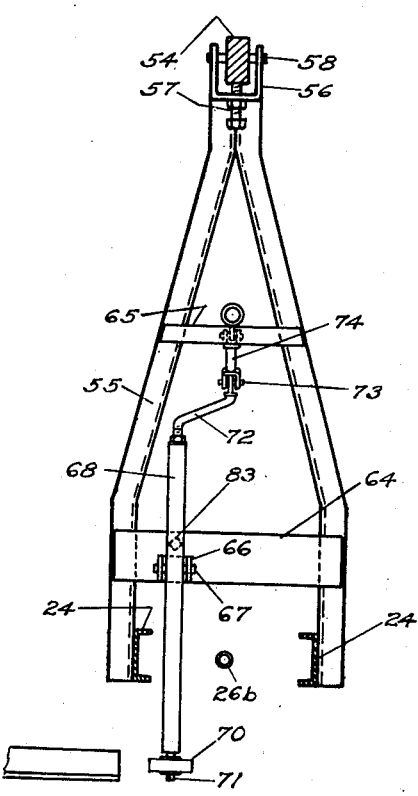
Figure 12 is an enlarged, partial-elevation, as viewed in the direction of arrows 12, 12 in Figure 1.

To more clearly understand the mounting of lever 54 on the rotatable table assembly, reference is directed to Figures 9 and 12.

It will be observed that a vertically-projecting support is fixedly secured to the channel supports 24, which channel supports have been previously described as being fixedly secured to the top surface of the annular member 20. Each vertical support consists of two upright members 55, which uprights are secured one to the other at their top ends. At the top end of the uprights 55 a bearing cradle 56 is fixedly secured thereto. As shown in Figure 9 the lever 54 is pivotally secured to the cradle 56 at 58. It will also be observed that the lever 54 has an extension on the opposite side of the pivotal connection to which a suitable counter-weight 59 is adjustably secured thereto. The purpose of the counter-weight is to counter-balance the weight of lever 54, ring 53, chain 53a and roller 60. In Figures 9 and 12 particular reference is also made to the adjusting screw 57, which screw is mounted in the base of the bearing cradle 56. The purpose of the adjusting screw 57 is to limit the downward movement of the lever 54, so as to prevent the lever 54 from striking the upper end of a barrel-shell, and also to limit its downward movement in the event the corresponding support 25 is not loaded with a barrel-shell. As illustrated in Figure 9, the uprights 55 are also provided with braces 62, which braces are fixedly secured to the channel supports 24.

With reference to Figures 3 and 9, it will be observed that a cam rail 63 is fixedly secured to the inner wall of the canopy 30. It is to be noted that the cam rail 63 is constructed and arranged to raise each roller 60 upwardly after each corresponding barrel-shell has passed beyond the spray head, and to retain each roller so raised until after the corresponding support 25 has passed beyond the loading position. Each roller 60 is pivotally secured to its corresponding lever 54 at 61. Therefore, it will be apparent that the raising of each roller 61 also raises each corresponding lever 54, which, in turn, lifts the corresponding protecting ring 53 from the barrel-shell. With the protecting ring lifted from the barrel-shell, the corresponding charred barrel-shell is in condition for ejection from the machine, and the barrel-shell support is ready for reloading as soon as the charred barrel-shell is ejected.

In the drawings it is to be observed that the barrel-shell support 25 and protecting ring 53 are substantially open through their central portions and provide relatively free communication with the atmosphere and the interior of the barrel-shell. This arrangement assures combustion being readily supported within the barrel-shell, so as to provide for uniform and thorough charring thereof.

Ejecting device

The ejecting device is provided to remove automatically charred barrel-shells from the machine, so that the operator need only to be concerned with the loading of the machine. Reference is made to Figures 9, 10, 11 and 12 as illustrating the construction and arrangement of the ejecting device. In Figures 9 and 12 it will be observed that transverse members 64 and 65 are fixedly secured to the uprights 55. These transverse members serve to support the barrel-shell ejecting-device. A bearing cradle 66 is fixedly secured to the member 64 and has pivotally mounted therein at 67, a lever 68. It is to be understood that the lever 68 operates in a plane substantially at right angles to the upright surface of member 64, as indicated by the arrow S in Figure 9. In Figures 9 and 12, it will be observed that lever 68 has a roller 70 pivotally secured to its lower end at 71. At the upper end of lever 68 an adjustable extension 72 is provided, which extension is pivotally secured at 73 to a link 74. Referring to Figure 9 in particular, it will be observed that the braces 62 for the uprights 55, have fixedly secured thereto brackets 75. At the upper end of the brackets 75 a tubular guide 76 is fixedly secured thereto, which guide is also fixedly secured to the transverse member 65. Within the tubular guide 76 a plunger 77 operates. Each plunger fixedly carries a lug 78, which lug projects downwardly through a slot 79 in the under side of the tubular guide 76. To more clearly understand this construction, reference is directed to Figures 10 and 11, where it will be observed that a pusher rod 80 is adjustably mounted in the outer end of the plunger 77. Referring now to Figure 9, it will be observed that the link 74 is pivotally secured at 81 to the downwardly depending lug 78. A tension spring 82 operates between a bracket 75 and the extension 72, and serves to bias the ejecting device to its normal position, which position is illustrated in Figure 9. To limit the return movement of the ejecting device, an adjusting screw or limit stop 83 is provided.

A cam guide 84 is provided, and is positioned on the machine so as to operate each ejecting device after the corresponding protecting ring 53 has been lifted, and before the corresponding barrel-shell support reaches the loading position. Referring to Figure 1 in particular, it will be observed that the cam rail 84 is fixedly secured to the reinforcing channel section 18a at the left of the central hub 19. In Figure 9 the relative position of the ejecting device is illustrated immediately prior to the roller 70 engaging the cam surface 84. Therefore, by observing Figure 1, it will be apparent that the maximum outward travel of the plunger 77 is accomplished when the radial center line of each barrel-shell support 25 is substantially at right angles with the cam surface 84. At this time the corresponding pusher rod 80 will tilt its barrel-shell sufficiently to deposit same by gravity onto the conveyor rails 15e. It will likewise be apparent that the cam surface 84 is constructed and arranged so that each ejecting device is restored to normal, or into the clear of its ejecting position, before the loading position is reached.

In order to accommodate proper ejection of various barrel-shells, the pusher rod 80 and extension 72 are each adjustably secured to their corresponding parts, and it is believed that the functions of these adjustments will be apparent from an inspection of Figures 9 and 12.

Operation

In operating the machine, it is to be understood that the motor M is placed into operation, which motor operates continuously throughout the operation of the machine. With the motor M in operation, the desired pilot 33 or 34 is ignited and regulated to establish a flame sufficient to ignite the gas burners 26 as they pass thereover. It is to be likewise understood that the operation of the pilot is continuous as long as the machine is in operation. With the motor M operating, the rotatable table assembly continuously revolves. With each barrel-shell support 25 unloaded, the single acting valve 17 and the double-acting valve 27 remain inoperative. Accordingly, under these conditions the spray head 16s, and each gas burner 26 will remain inoperative. As each barrel-shell support 25 passes the operator at the loading position 0, a barrel-shell is rolled into position on the corresponding barrel-shell support. With the barrel-shell properly positioned therein, the upper valve of the double acting valve 27 is opened, and the plunger 45 depressed for subsequently, momentarily-opening the water supply valve 17.

Shortly after each loaded barrel-shell support 25 leaves the loading position 0, the lower valve of the double acting valve 27 is opened via cam rail 32. With both valves of the double acting valve open, gas is directed to the corresponding burner 26, and the flame of pilot 33 accordingly ignites the burner. Each correspondingly ignited gas burner continues to operate until the cam rail 32 is subsequently disengaged. As hereinbefore mentioned, the cam rail 32 is adjusted to retain the lower valve of each double-acting valve open for a time sufficient to assure that each corresponding barrel-shell is ignited, so that charring continues until each corresponding depressed pin 45 subsequently opens the single-acting water valve 17, for spraying water into the corresponding barrel-shell from the spray head

16s. Shortly thereafter, each roller 60 is raised by the cam rail 63, which, raising accordingly lifts the corresponding protecting ring 53 free of the top edges of the charred barrel-shell. As rotation of the table continues, the roller 70 of each ejecting device engages the cam 84, and, as each corresponding barrel-shell support 25 reaches a position substantially at right angles with the conveyor rails 15e, the associated ejecting device deposits the charred barrel-shell onto the conveyor rails 15e by gravity. Whereupon, the support 25 moves into loading position, where the operator reloads the support with another shell.

Accordingly, it will be apparent that the rotatable table is continuous in its operation, and that the operator is principally concerned only with the loading of the machine. It is important to note that, in loading the machine, it is the proper location of a barrel-shell in a support that conditions the corresponding burner for operation, and the subsequent application of an intermittent spray of water after the charring is completed. Accordingly, the operator, under certain conditions of operation, is permitted to load only alternate barrel-shell supports, or only the supports that appear necessary to obtain the desired capacity, since an unnecessary operation of the gas burners for the unloaded supports, or a spray of water for the unloaded supports, is prevented. It will be apparent, therefore, that the coordination of the various instrumentalities provides for a great economy in operation, in that fuel for each gas burner 26 is consumed only for a time sufficient to ignite the corresponding barrel-shells, and only when a barrel shell is properly located in its support. It will also be apparent that, since the time in which combustion within the barrel-shells is limited to a definite time, very uniform charring of the barrel-shells is provided. This feature is very important in production manufacturing, and it is particularly stressed that the machine disclosed herein, together with its method of operation, has proven to be a very contributing factor thereto.

Having thus described my invention, I claim:

1. A machine for charring barrel-shells including, a rotatable carrier; means continuously rotating said carrier; a plurality of burners, each for producing a flame within a barrel shell, and each fixedly mounted in spaced relation, one with the other, about the perimeter of the said carrier for movement therewith; a fuel supply pipe at the center of rotation of the said carrier; a fuel-distribution chamber fixedly secured to the said carrier in axial alignment with said supply pipe, and rotatably coupled and sealed thereto; a plurality of pipes from the said chamber, each leading to a said burner, and each having included therein a normally-closed valve; a plurality of supports, each fixedly mounted on the said carrier, and each adapted to support a barrel-shell above a burner, so that the flame from each said burner will ignite the interior of each corresponding barrel-shell to provide for charring thereof; a pilot flame located in the path of movement of the said burners; and means successively opening each valve as each corresponding burner passes the said pilot flame, for successively igniting the said burners.

2. A machine for charring barrel-shells including, a rotatable carrier; means continuously rotating said carrier; a plurality of burners, each for producing a flame within a barrel shell, and each fixedly mounted in spaced relation, one with the other, about the perimeter of the said carrier for movement therewith; a fuel supply pipe at the center of rotation of the said carrier; a fuel-distribution chamber fixedly secured to the said carrier in axial alignment with said supply pipe, and rotatably coupled and sealed thereto; a plurality of pipes from the said chamber, each leading to a said burner, and each having included therein a normally-closed valve; a plurality of supports, each fixedly mounted on the said carrier, and each adapted to support a barrel-shell above a burner, so that the flame from each said burner will ignite the interior of each corresponding barrel-shell to provide for charring thereof; a pilot flame located in the path of movement of the said burners; means successively opening each valve as each corresponding burner passes the said pilot flame, for successively igniting the said burner; and means successively closing each valve, for successively extinguishing the said burners.

3. A machine for charring barrel-shells including, a rotatable carrier; means continuously rotating said carrier; a plurality of burners, each for producing a flame within the interior of a barrel-shell, and each fixedly mounted in spaced relation, one with the other, about the perimeter of the said carrier for movement therewith; a plurality of conduits, each leading to a said burner, and each having included therein a normally-closed valve, each of said valves having an actuating arm; a plurality of supports each fixedly mounted on the said carrier, and each adapted to support a barrel-shell adjacent a burner, so that the flame from each said burner will ignite the interior of each corresponding barrel-shell to provide for charring thereof; a pilot flame located in the path of movement of the said burners; and an annular stationary-cam for successively contacting with each of said actuating arms, as each burner passes the said pilot flame, for successively igniting the said burners.

4. A machine for charring barrel-shells including, a rotatable carrier; means continuously rotating the said carrier; a plurality of burners, each for producing a flame within a barrel-shell, and each fixedly mounted in spaced relation, one with the other, about the perimeter of the said carrier for movement therewith; a plurality of conduits for supplying fuel to the said burners, each conduit leading to a said burner; a like plurality of normally-closed valves, each included in a said conduit; a plurality of supports, each fixedly mounted on the said carrier, and each adapted to support a barrel-shell adjacent a burner, so that the flame from each said burner will ignite the interior of each corresponding barrel-shell to provide for charring thereof; a pilot flame located in the path of movement of the said burners; means successively opening each valve, as each corresponding burner passes the said pilot flame, for successively igniting the said burners; and means cooperating with each valve, retaining each valve open for a time sufficient to ignite the interior of the corresponding barrel-shell.

5. A machine for charring barrel-shells including, a rotatable carrier; means continuously rotating the said carrier; a plurality of burners, each for producing a flame within a barrel-shell, and each fixedly mounted in spaced relation, one with the other, about the perimeter of the said carrier for movement therewith; a plurality of conduits for supplying fuel to the said burners, each conduit leading to a said burner; a like plurality of normally-closed valves, each included in a said conduit; a plurality of supports, each fixedly mounted on the said carrier, and each adapted to support a barrel-shell adjacent a burner, so that the flame from each said burner will ignite the interior of each corresponding barrel-shell to provide for charring thereof; a pilot flame located in the path of movement of the said burners; means successively opening each valve, as each corresponding burner passes the said pilot flame, for successively igniting the said burners; means cooperating with each valve, retaining each valve open for a time sufficient to ignite the interior of the corresponding barrel-shell; a water supply line having a spray nozzle located in the path of movement of the said barrel-shells; a normally-closed valve included in the said water supply line; and means successively and intermittently opening the said water valve, as each ignited barrel-shell passes the said nozzle, for spraying water into the said barrel-shell to extinguish the flame thereof.

6. The machine as set forth in claim 5, comprising in addition, means for ejecting each barrel-shell from the carrier, after the water valve has been actuated to provide for extinguishing the flame of the corresponding barrel-shell.

7. A machine for charring barrels including, a rotatable carrier; means continuously rotating said carrier; a plurality of burners, each for producing a flame within a barrel, and each fixedly mounted on said carrier about the perimeter thereof; a like plurality of fuel supply conduits, each leading to a said burner, and each having included therein a normally-closed valve; a like plurality of supports, each fixedly mounted on the said carrier, and each adapted to support a barrel adjacent a burner, so that the flame from each said burner will ignite the interior of each corresponding barrel to provide for charring thereof; and means operatively engaged by each barrel, when the said barrel is in position in a support, for opening the corresponding valve; a pilot flame located in the path of movement of said burners; and means successively supplying fuel to the said conduits, as each corresponding burner passes the said flame, for successively igniting the said burners.

8. In a machine for charring barrels, a horizontally disposed circular carrier; means continuously rotating said carrier; a plurality of burners, each for producing a flame within a barrel, and each mounted on the said carrier for movement therewith; a fuel supply pipe at the center of rotation of said carrier; a fuel distribution chamber fixedly secured to the said carrier in axial alignment with the said supply line, and rotatably coupled and sealed thereto; a plurality of pipes from the said chamber, each leading to a said burner, and each having included therein a normally closed valve; a like plurality of supports mounted on the said carrier, and each adapted to support a barrel adjacent a burner, so that the flame from each burner will ignite the interior of each corresponding barrel to provide for charring thereof; a like plurality of protecting-rings, each for protecting the end edges of a barrel from flame; means for successively removing each protecting-ring to permit removal and replacement of the corresponding barrel; and means for successively replacing each protecting ring into engagement with the end edges of each corresponding barrel.

9. In a machine for charring barrel-shells, a rotatable carrier; means continuously rotating said carrier; a plurality of burners, each for producing a flame within a barrel-shell, and each fixedly mounted on the said carrier for movement therewith; a fuel distribution chamber fixedly mounted on the said carrier at the center of rotation thereof; a plurality of pipes from the said chamber, each leading to a said burner, and each said pipe having a control valve; an axially aligned supply pipe rotatably coupled and sealed to the said chamber; and a plurality of supports mounted on the said carrier, each adapted to support a barrel-shell adjacent a said burner, so that the flame from each burner will ignite the interior of each corresponding barrel-shell and provide for the charring thereof.

10. In a machine for charring barrel-shells, a horizontally-disposed, rotatable-carrier; means continuously rotating said carrier; a plurality of burners, each for producing a flame within the interior of a barrel-shell, and each fixedly mounted on the said carrier for movement therewith; means for supplying fuel to the said burners; a plurality of supports, each mounted on the said carrier, and each adapted to support a barrel-shell above a burner, so that the flame from each burner will ignite the interior of each corresponding barrel-shell and provide for the charring thereof; a like plurality of rings, each for protecting the upper end edges of the barrel-shells from the flame of its corresponding burner, and each ring having operatively associated therewith, means for loosely supporting each corresponding ring above a burner; means for successively raising each support and ring, to permit removal and replacement of said barrel-shells; and means for lowering said supports and rings into engagement with the upper end edges of a corresponding barrel-shell.

11. In a machine for charring barrel-shells, a horizontally supported carrier; means for advancing the said carrier; a plurality of burners, each for producing a flame within the interior of a barrel-shell, and each fixedly mounted on the said carrier for movement therewith; a plurality of supports each fixedly mounted on the said carrier, and each adapted to support a barrel-shell above a burner, so that the flame from each burner will ignite the interior of each corresponding barrel-shell and provide for the charring thereof; a like plurality of protecting rings, each above a burner, and each for protecting the upper end edges of a corresponding barrel-shell from flame; means for successively raising each said ring, to permit removal and replacement of the corresponding barrel-shell; and means for successively lowering each ring into engagement with the upper end edges of the corresponding replaced barrel-shell.

12. In a machine for charring barrel-shells, a carrier; means for advancing the said carrier; a plurality of burners, each for producing a flame within the interior of a barrel-shell, and each fixedly mounted on the said carrier for movement therewith; a like plurality of supports, each mounted on said carrier, and each adapted to support a barrel-shell above a burner, so that the flame from each burner will ignite each corresponding barrel-shell; a like plurality of protecting-rings, each above a burner, for protecting the upper end edges of the corresponding barrel-shell from flame; a plurality of actuating devices, at least one for each of the said protecting rings, and each having a cam engaging means, each of the said actuating devices having an operative connection with a said protecting-ring, for raising and lowering the corresponding ring out of and into engagement with the upper end edges of a corresponding barrel-shell; a stationary cam fixedly mounted in the path of the said cam engaging means constructed and arranged for successively actuating the said cam engaging means of the said actuating devices.

13. Means for charring barrel-shells, including a working floor; a pit having a floor depressed below the level of the said working floor; a pivotal post; a circular track concentric with the said post and fixedly secured to the floor of the said pit; a carrier centered on the said pivotal post, and having supporting rollers running on said track; means for rotating said carrier; a plurality of burners, each for producing a flame within the interior of a barrel-shell, and each fixedly mounted on the said carrier for movement therewith, the tops of the said burners being substantially in line with the level of the working floor; a like plurality of supports mounted on the said carrier, and each adapted to support a barrel-shell above a burner, so that the flame from each burner will ignite each corresponding barrel-shell and provide for the charring thereof, the top of the said supports being substantially in line with the level of the working floor; a like plurality of rings for protecting the upper end edges of the said barrel-shells from flame; a like plurality of means, each for supporting a ring above a said burner; other means, engageable with each of the said latter means, for raising and sustaining the said latter means and rings, to permit removal and replacement of the corresponding barrel-shell; and means for lowering successively each of the said protecting-rings into engagement with the upper end edges of each corresponding barrel-shell.

14. Means for charring barrels including, a working floor; a pit having a floor depressed below the level of the said working floor; a circular track fixedly secured to the floor of the said pit; a carrier having supporting rollers running on the said track; means for rotating the said carrier; a plurality of burners, each for producing a flame within the interior of a barrel, and each fixedly mounted on the said carrier for movement therewith, the tops of the said burners being substantially in line with the level of the working floor; a like plurality of supports mounted on the said carrier, and each adapted to support a barrel adjacent a burner, so that the flame from each burner will ignite the interior of each corresponding barrel-shell and provide a charring thereof; a like plurality of rings for protecting the upper end edges of the said barrels from flame; a like plurality of means, each for supporting a ring above a said burner; other means, engageable with each of the said latter means in succession, for successively raising and sustaining the said latter means and rings to permit removal and replacement of each corresponding barrel; and means for lowering successively each of the said rings into engagement with the upper end edges of each replaced barrel.

15. A machine for charring barrel-shells including, a rotatable carrier; means continuously rotating said carrier; a plurality of burners, each for producing a flame within the interior of a barrel-shell, and each fixedly mounted on the said carrier for movement therewith; a like plurality of supports mounted on the said carrier, each adapted to receive and support a barrel-shell above a burner; a like plurality of protecting rings, each above a burner, for protecting the upper end edges of a corresponding barrel-shell from flame; means, each for engaging a said ring; means successively raising each said engaging means, for removing each corresponding ring from the upper end edges of its corresponding barrel-shell to permit ejection and replacement thereof; means, coordinated with said ring-raising means, for ejecting each of said shells in succession, to permit replacement thereof; and means successively lowering each said engaging means, for restoring each protecting-ring in protecting position, about the upper end edges of the corresponding replaced barrel-shell.

16. A machine for charring barrel-shells including, a carrier; means continuously progressing said carrier; a plurality of barrel-shell supports mounted on said carrier, each adapted to receive and support a barrel shell thereon; a like plurality of burners, each mounted within a said support, so that the flame therefrom will ignite the inner wall surface of each corresponding barrel-shell and provide a charring thereof; and means, intermittently igniting the said burners for a predetermined period of each cycle of operations.

17. In a machine for charring barrel-shells including, a carrier; means continuously moving said carrier; a plurality of supports mounted on the said carrier, each adapted to receive and support a barrel shell thereon; a like plurality of burners, each adapted to direct its flame into the interior of a said barrel-shell for charring same; means intermittently igniting each of said burners for a predetermined portion of the cycle of operations; a water spray nozzle, positioned in the line of movement of the said charred barrel-shells, for directing a stream of water into the interior of each charred barrel-shell; and means for successively ejecting each charred barrel-shell from the machine.

FRANK B. SCHORCK.